Jan. 8, 1963  R. B. STITZER  3,072,468
METHOD AND APPARATUS FOR DETECTING CHANGES IN THE
HEATING QUALITY OF FUEL GAS-AIR MIXTURES
AND FOR PRECISE CONTROL THEREOF
Filed Dec. 18, 1957  2 Sheets-Sheet 1

Ralph B. Stitzer INVENTOR.

BY Theron Eugene Burta Jr.,
Attorney

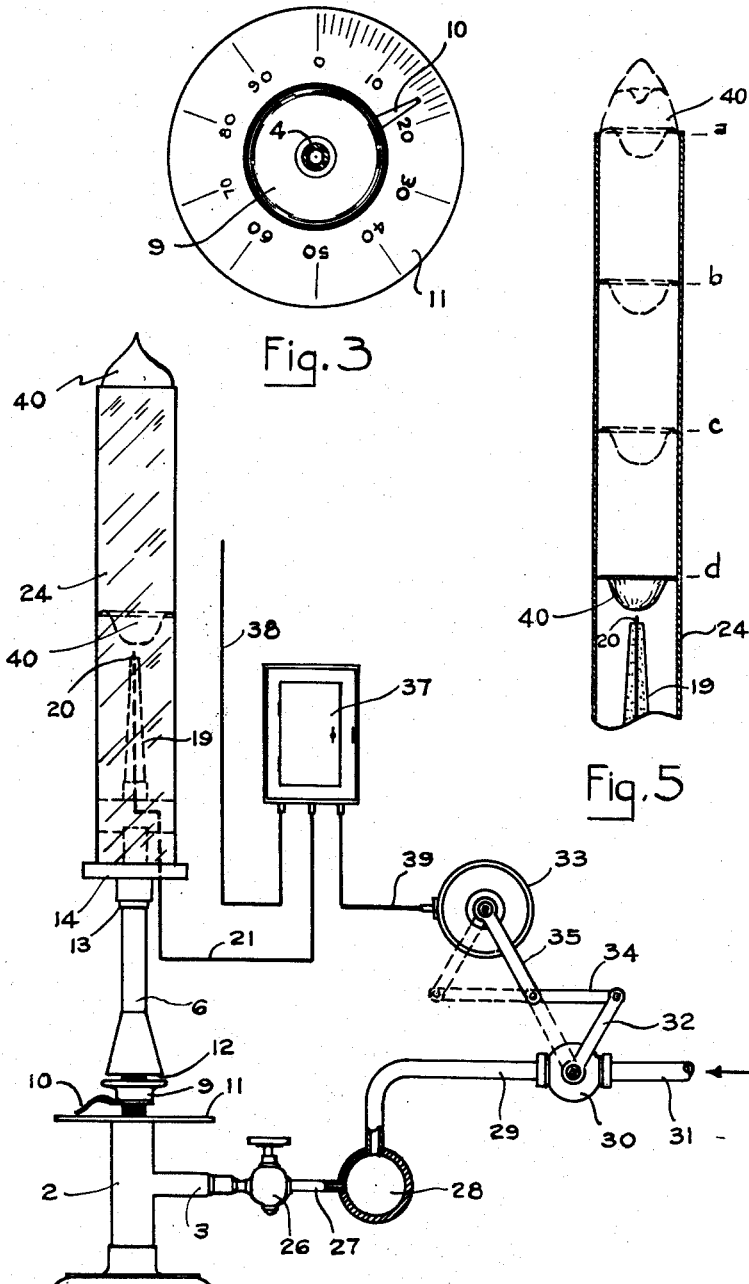

United States Patent Office 3,072,468
Patented Jan. 8, 1963

3,072,468
METHOD AND APPARATUS FOR DETECTING CHANGES IN THE HEATING QUALITY OF FUEL GAS-AIR MIXTURES AND FOR PRECISE CONTROL THEREOF
Ralph B. Stitzer, 907 Montgomery Ave., Sheffield, Ala.
Filed Dec. 18, 1957, Ser. No. 703,707
5 Claims. (Cl. 48—180)

This invention relates to the combustion of fuel gases and it deals more particularly with a method and apparatus for the detection of changes in the heating quality of fuel-gas air mixtures and the automatic precise control thereof.

It is, therefore, a primary object of the invention to provide a method and apparatus whereby the heating quality of a gas mixture may be determined with respect to its combustion characteristics.

In connection therewith, it is a further object of the invention to provide a method of control of combustion by means of an apparatus which may be calibrated and sensitive to automatically compensate for the variations in quality of supplied gas mixtures whereby, by regulation of a component, a desired ratio in such mixtures may be maintained to effectuate a constant heating quality.

The heat value of fuel gas and its burning characteristics, particularly the number of B.t.u. delivered at the point of combustion, have long been of primary consideration to utilities serving both the individual consumer and industrial users. Depending upon the locality, utilities may supply coke oven gas, coal gas, carburetted water gas, mixtures of these gases, butane, or, in ever increasing numbers of communities, natural gas. The mixtures supplied can vary greatly, depending upon availability, in the normal B.t.u. supplied. The mixture could be primarily refinery gas, supplying 1700 B.t.u. per cubic foot, or coke gas at 550 B.t.u. per cubic foot. The basic problems of combustion are present, however, in any case.

Even the household consumer is familiar with the visible effects attendant upon a change over in the community from the use of one type of gas to the use of another. The loss or gain of heat at the burning orifice results in the necessity of the modification or total discard of household appliances. While these visible effects are inconvenient and moderately costly to the residential consumer, they are symptoms of conditions which can be financially disastrous to the industrial consumer and point to certain characteristics of fuel gases which affect the rate of combustion. For example, in certain types of industry, the chemical or steel industry, it may be necessary that the product being heated be subjected to a constant temperature over a definite period of time. This is particularly true in the processing of steel forgings. A sudden change in the furnace temperature and atmosphere may ruin the product. A change over from one type of fuel gas to another can be costly in the required adjustments at the furnace to maintain the same B.t.u. delivery and efficiency at the burner orifice.

In view of the foregoing, extensive research has been conducted in the fuel gas industry to determine means for adjustment for the differences in heat values of different kinds of gas mixtures. The result has been the discovery, which is now well known, that various types of commercially available fuel gases can be equivalent in their effect at the burner orifice in B.t.u. delivered per unit of time at constant pressure dependant upon the amount of air entrained in the mixture. The following table is illustrative of some of the physical and chemical characteristics of the gases in general use today.

Fuel Gases

| Component Gases | Constituents—Percent | | | | | | | | B.t.u. per Cu.Ft. | Sp.Gr. Gas Air=1 | Air Req'd, Cu.Ft./ Cu.Ft. Gas | B.t.u./ Cu.Ft. Mixture |
|---|---|---|---|---|---|---|---|---|---|---|---|---|
| | $CH_4$ | $C_2H_6$ | Ills. | CO | $CO_2$ | $H_2$ | $O_2$ | $N_2$ | | | | |
| 1. Natural Gas | 83.0 | 16.1 | 0.8 | | 0.1 | | | | 1,122 | .668 | 10.70 | 96 |
| 2. Coke Oven Gas | 29.0 | 0.4 | 2.4 | 5.6 | 1.2 | 55.7 | 0.9 | 4.8 | 550 | .370 | 4.73 | 96 |
| 3. Coal Gas | 31.4 | | 2.2 | 8.6 | 1.5 | 52.5 | 0.3 | 3.5 | 575 | .420 | 5.00 | 96 |
| 4. Oil Gas | 25.4 | | 4.8 | 6.8 | 1.0 | 59.2 | 0.1 | 2.7 | 575 | .350 | 4.91 | 97 |
| 5. Carb. Water Gas | 11.0 | 0.9 | 10.1 | 30.8 | 2.6 | 35.4 | 0.9 | 8.3 | 560 | .640 | 4.72 | 96 |
| 6. Low Grav. W. Gas | 15.4 | 1.3 | 7.4 | 22.1 | 3.2 | 45.9 | 0.4 | 4.3 | 554 | .544 | 4.75 | 96 |
| 7. Butane—Air | Butane.. | 17.2 | | | | | 17.3 | 65.5 | 550 | 1.163 | 4.50 | 100 |

American Gas Association Monthly, April 1932.

It is significant that the most commonly used fuel gases, both for home and industrial purposes, are made up of hydrogen, carbon monoxide, carbon dioxide and hydrocarbons in varying proportions, as revealed by the above table which also reveals that each of these gases, when mixed with the correct amount of air for effective combustion, has a B.t.u. value of 96 to 100 B.t.u. per cubic foot.

Due to the properties illustrated, it has also been found that it is possible to establish a setting on a burner where, by changing the amount of air premixed with the gas in the main gas line, we are able to secure identical results in the combustion of the various gases without altering in any way the setting of the burner.

With the foregoing principle in mind, it is worth while to consider the typical situation at the point of gas consumption. The home user will have a burner provided with a primary air intake inlet which can be regulated to provide the desired flame with the gas supplied. This setting of the air inlet is usually constant, once regulated, and the user thereafter simply regulates the valve controlling the flow of gas to the unit. The same is true in industry. Consider a furnace unit with one or more burners. There is a primary air intake inlet, at the furnace, provided for each burner or a group of burners. The operator, with a known gas mixture, regulates the primary air intake on the burners to obtain the standard setting for the gas being used, and provide the desired B.t.u. at the flame; and then he must depend upon his supplier to maintain a constant B.t.u. per unit volume gas mixture lest he be required to constantly readjust his primary air intake at the individual burners in order to maintain a constant B.t.u. delivery.

There is also present, however, the problem of quality changes with respect to B.t.u. delivery in any fuel gas supplied, at the point of combustion, due to changes in barometric pressure in the system with attendant variations in specific gravity. Since constant burner effects with respect to B.t.u. delivery are of primary importance to the industrial consumer, where the user does not wish to be subjected to the hazard of constantly required adjustments throughout his burner system, it is essential that some means be provided, at the point of intake into the system, for detecting the changes in the heating quality of the incoming gas and immediately compensating for these changes to prevent the objectionable results mentioned.

Since it has been found that changes in the heating quality of the gas can therefore be compensated for by the variation of the amount of entrained air in the supplied gas mixture, it is a further object of my invention that a method and apparatus for control of the heating quality with respect to B.t.u. content of gas supplied be provided wherein the amount of entrained air required by the system for constant burner effects is automatically determined and regulated.

It is generally known to engineers familiar with fuel gas and its application that the flow of gas through a burner orifice varies as the square root of the reciprocal of the specific gravity of the gas, and that the product of this factor and the inherent B.t.u. of the gas passing through the orifice yields a true value of the heat developed under the circumstances. Combinations of several gases can be adjusted to burner requirements by adding air to produce a B.t.u. specific gravity relationship which yields equivalent heating effects.

For example, the following gas-air mixtures are equal at the burner orifice and having the same heating effect are interchangeable.

Carb. water gas—608 B.t.u., 0.62 specific gravity plus 18% air

Coke oven gas—580 B.t.u., 0.45 specific gravity plus 23% air

Natural gas—1100 B.t.u., 0.65 specific gravity plus 40% air

Oil Refy. gas—1550 B.t.u., 0.91 specific gravity plus 62% air

Applying the equalizing formula mentioned above, $$\text{B.t.u.} \times \sqrt{\frac{1}{\text{sp. gr.}}}$$

in each case gives the same heat delivery at the burner orifice, namely 600 B.t.u. during equal intervals of time.

It is well known that in the principle of combustion of gases employed in a Bunsen burner, there is a sharp demarcation between too much gas, just the right amount of gas, and too much air; and that these conditions are definitely indicative of intake of too much or too little air. Where there is too much air introduced at the burner, the flame flashes back to the point where the gas first meets the air. Where there is an insufficiency of air introduced, incomplete combustion results and the flame rises off the top of the burner in order to get additional air from the atmosphere in order to satisfy the requirements of combustion. I have found that by providing, in connection with a Bunsen type burner, a special combustion chamber, elongated and made of material such as glass which allows observation of the behavior of a flame, that these characteristics of a flame may be utilized to indicate the gas-air ratio of a mixture. In operation I have employed, for example, an elongated glass tube, affixed over the tip of a burner, having a diameter of approximately 1.34 inches and about 15 inches in length. I have found that one may ignite the gas mixture supplied to said apparatus at the open end of the glass tube which forms my combustion chamber. With the regulation of the air, the flame will burn in a normal manner at the open end of the tube. However, experiments have shown that by increasing the amount of air supplied to the gas mixture being used, this flame is gradually drawn down in the form of a horizontal semi-tenuous membrane into the tube or combustion chamber, with the appearance of an inverted meniscus; the more air being introduced, the farther down into the tube the flame will descend, still burning, with the aforesaid inverted meniscus effect. On the other hand, as the supply of air is decreased, the flame will be caused to gradually rise in the glass tube, or combustion chamber, until it finally reaches the top of the tube again, the meniscus or apex of the flame again assuming the normal characteristics.

I have found that the behavior of the flame in such a special control burner, calibrated to desired conditions, is responsive to changes in the air ratio to the extent of one part in ten thousand in the mixture of gas and air being supplied to said burner to cause the entire semi-tenuous membrane or body of flame to migrate from the open upper end of the elongated combustion chamber to extreme lower end of the chamber; or, where the air ratio is maintained fairly constant to provide a body or membrane of flame substantially balanced or stabilized as to movement at a predetermined level in said chamber.

According to the practice of my invention, any change in the gas and/or air combination which causes the balanced or stabilized membrane-like body of flame to migrate or travel up or down in the combustion chamber, can be utilized to cause the moving flame to actuate a thermo-electric control system, which, in turn, can compensate for the conditions which cause the flame to move. For example, thermo-electric means sensitive to the movement of the flame in a specific direction may be used to open or close valves which admit air to the main gas supply in such manner as to increase or decrease the amount of entrained air to compensate for movement in the opposite direction. The thermo-electric means employed to detect the migration of the flame could be a photoelectric cell sensitive to the position of the flame, or a grid surrounding the combustion chamber or adjacent thereto and sensitive to the movement of the flame or responsive to infra-red radiation. In the embodiment of my invention shown, I have utilized in the combustion chamber, a thermocouple as the thermo-electric means sensitive to the movement of the flame, operative in the manner which will be described to actuate the automatic means regulating the air supply to a gas system.

It is a salient feature of my invention that the behavior of a moving flame, as aforesaid, in its special effects be employed to actuate automatic equipment regulating the flow of entrained air into the main gas supply. In other words, the correction is made to the entire gas distribution system as a whole rather than to the individual burners of such a system as is required now, where previously an operator has been required to regulate each of the valves on each main burner at a furnace to compensate for a change in heating quality of the gas.

It is possible to mix all fuel gases in all proportions and by adjusting the air in the mixture to meet the burner requirement for perfect combustion by means of the aforesaid floating flame control burner and the automatic air valve regulator, even to the extent of compensating for changes in barometric pressure, temperature and humidity.

In the use of my invention, any change in the gas and/or air combination, which causes the balanced flame to migrate, up or down, will immediately produce a compensating adjustment at the entrained air inlet valve for the entire gas system.

In the accompanying drawings, which form a part of the specification and are to be read in conjunction therewith, and in which like reference numerals are employed to indicate like parts of the various views:

FIG. 3 is a sectional view taken along the lines 3—3 of FIG. 1, showing the index plate and pointer for calibration of the unit.

FIG. 4 is a diagrammatic view of the burner unit and control system for the regulation of the flow of entrained air into the main gas conduit.

FIG. 5 is a diagrammatic view of the top of the glass combustion chamber indicating the alternate positions and behavior of the flame in operation of the system.

Figures 1, 2:
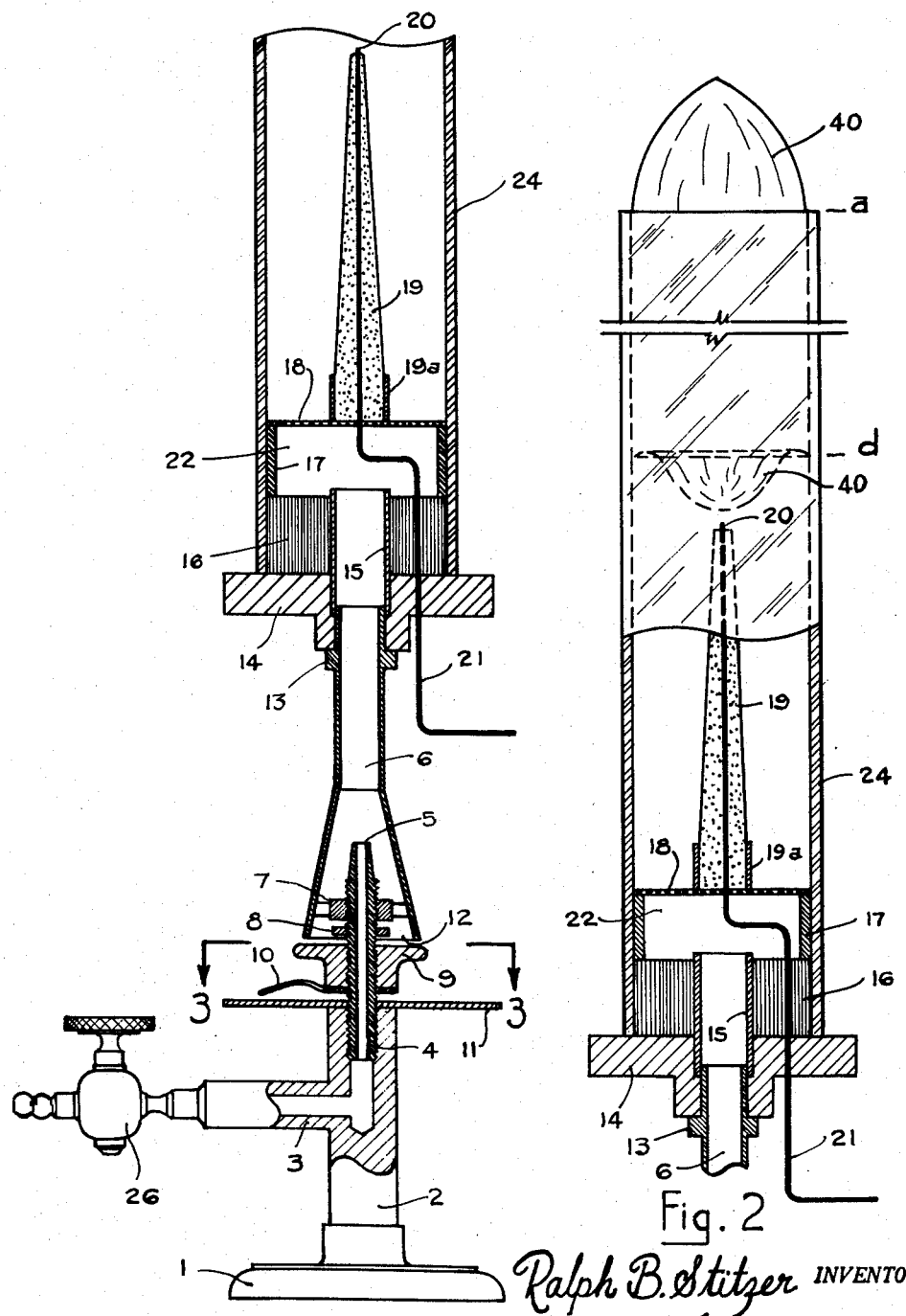
FIG. 1 is an elevation view, partly in section, and cut away, partially broken in length, of the calibrated control burner unit of the invention wherein a sample of gas is burned.
FIG. 2 is a somewhat diagrammatic view of the top portion of burner of FIG. 1 in extension, and partially cut away, to show the top of the burner combustion chamber, with alternate positions of the flame in burning.

Referring more particularly to the drawings, in FIG. 1, it will be seen that I have provided, as a control burner, a modified Bunsen type burner having a base 1, shank 2 with a gas inlet connection 3. The shank 2 has a threaded orifice spud 4 having an orifice 5 of special size, as later described. The spud supports a primary mixing chamber 6 by means of a threaded collar bracket 7. The spud is also provided with a square collar 8 which is integral with the spud and necessary to tighten the spud in shank 2. Threaded onto the spud is a shutter 9 (also shown in FIG. 3) which has a pointer in register with index plate 11 fixed to the shank 2 as shown. Pointer 10 and plate 11 are shown in register in FIG. 3. The operation of this portion of the unit is the same as in the usual Bunsen type burner, wherein the turning of the shutter or dial 9 on the threaded spud 4 opens or closes the formed annular opening 12 at the base of the flared primary mixing chamber 6, which allows more or less primary air to enter the chamber.

I have provided the upper end of the mixing chamber 6 with a special shoulder 13 which supports a flange collar 14 as shown. This flange collar is bored to accommodate the upper tip of the mixing chamber 6 and a special chamber extension 15, as well as having another small bore to accommodate the lead wires described hereinafter. Around the extension 15 there is placed an insulative packing ring 16, which may be sized to fit as shown or comprise wrappings of packing. Over the packing ring there is inserted or disposed a loose collar 17 on which rests a perforated circular plate 18. I have found that a suitable perforate plate may have approximately 400 perforations per square inch, but other sizes may be used. In one embodiment the distance from the flange 14 to the top of the plate 18 is about four inches. With this perforated plate resting on one end of collar 17 it can be seen that there is formed at the tube or chamber extension 15 opening a diffusion chamber 22 immediately above the primary mixing chamber 6. Affixed to the top of the circular plate 18, by means of a brazed sleeve or suitable bracket 19a, I have located a frusto-conical carbon rod 19, as shown. This rod is bored as indicated and carries exposed at its upper end the tip of a thermocouple 20 having a pair of leads 21 passing through special bores in the packing 16 and collar flange 14, as indicated.

In the embodiment shown, I have then provided an elongated glass tube forming a combustion chamber 24 which slides down over packing 16 and rests on the collar flange 14, forming a tight fit with the packing 16 with collar 17 disposed loosely inside as shown. The combustion chamber 24 is more than twice the length of the burner up to the collar 14, in the embodiment illustrated. For the sake of illustration the chamber is somewhat foreshortened in the drawings. The diameter of the glass tube should be about three times that of extension 15, and, for best mixing and diffusion, chamber 22 should be as large as the diameter of the glass tube 24 permits.

Referring to FIG. 2 of the drawings, I have shown the combustion chamber 24 foreshortened in length such that the top of the unit may be visible for a view of the positions of the flame in combustion operation for the purposes of this description.

As can be seen from FIGS. 3, 4, and 5, the inlet connection of the control burner to the gas supply is through a valve 26 (for cut-off purposes) to a conduit 27 which taps the main gas line 28 which supplies the fuel for one or more industrial consumers. This equipment would be located, normally, at the industrial plant or site of the consumer; but this need not be necessary, as can be seen from its operation, for it may be operated as well at the central fuel plant. In this embodiment the main gas line 28 is also connected by means of a conduit 29 through a valve 30 with an intake line for air which, when introduced at this point, we shall refer to as "entrained air," this line being numbered 31, as indicated in FIG. 4.

The valve 30 is provided with an operating arm 32 which is connected by linkage 34 to an arm 35 actuated by a reversible electric motor 33. It will be obvious that the illustrations given in the drawings are diagrammatic and bear no relation in size to the actual size of the elements in use. It is apparent that a large gas main, such as might feed an industrial user, would be much larger in size than normal, and the valving system would be quite massive, requiring a motor for the movement of the valve arm 32 rather than a solenoid which could be used in a smaller system.

It would be anticipated that the control burner of my unit invention would be provided with the usual means for adjustment of primary air. For this reason, I have shown the customary shutter or dial 9, which opens and closes the aperture 12, in adjustment of air to the control burner for calibration as hereinafter explained, with a suitable indicator or pointer 10 registering with the index plate 11, which is divided for convenience into one-hundred graduations.

I have discovered that, by the use of a unique phenomenon in the behavior of a gas flame, burning in a special tube or combustion chamber, that flame, in a manner not heretofore realized, can be employed to actuate a control system, or instrument system, regulating the air mixture of the main gas supply producing the flame, since the behavior of the flame is peculiarly sensitive to the quality of the mixture.

For example, with the apparatus shown, the control burner, with the elongated combustion chamber 24, which I have made of glass for visibility of the effects, is ignited at the top of the combustion chamber, at point a, as shown in FIG. 5, with a rich gas mixture regulated by the shutter 9. This will cause the flame 40 to burn at the top of the combustion chamber, at a, as shown in FIGS. 2, 4, and 5, with a convex effect as to the apex of the flame, extending well above the top of the chamber, as indicated.

Now, as the gas mixture is supplied with more primary air by adjustment of the shutter 9, we note that the apex of the flame 40 is gradually drawn downwardly, through the stages diagrammatically shown in FIG. 5, the apex becoming concave, the body of flame, as more air is supplied, assuming the form of a horizontal semi-tenuious membrane and such body descending in the combustion chamber 24 into positions as shown at b, c, and so on, until, by careful regulation of the air, it reaches the position at d, with the inverted apex controlled to rest at least one-eighth of an inch, as preferred, above the thermocouple 20. This distance is not invariable; the flame should be farther away, rather than less, for better control. It can also be seen that by decreasing the amount of primary air supplied to the control burner the flame would be caused to ascend in the combustion chamber, back through the stages shown, until it burned at position a, again. It will further be realized that the same effect created by artificial control of the primary air on the control burner would also be created by an excess of entrained air coming into the control burner in the main gas mixture or the reverse in a gas mixture coming into the system starved of the usual supply of air.

It is readily apparent that the relative proportional change in the amount of entrained air in a commercially supplied gas mixture would not be as great as the artificial means used in regulating the control burner by the shutter dial 9. In effect the movement, or behavior of the flame, would not be as rapid in its changes, and, for normal changes in the main gas mixture, due to increase or decrease in air, the flame will move much more slowly.

Assuming that we have the control burner of my invention connected with a main gas conduit 28, as shown in FIG. 4, we can then calibrate the control burner, with the mixture being supplied from the conduit, by means of regulation of the shutter 9, to bring the flame 40 down into position d, so regulating the shutter as to hold the body of flame balanced or stabilized in this position by minutely increasing or decreasing the primary air in the gas-air mixture at the burner. At this point the thermocouple 20 is in close proximity to the lower surface of the floating flame. It is still not in actual contact with the flame or the products of combustion. The temperature of the thermocouple is approximately 400 F. With a slight increase of primary air the flame descends a fraction of an inch, probably less than a thirty-second of an inch produces a rise in temperature of the thermocouple to 700 F., continuing as the flame falls until, at a position where the thermocouple is three-eighths of an inch above the bottom of the flame, the temperature of the thermocouple is 1450 F. Conversely, a decrease in the air in the gas-air mixture causes the body of flame to rise, cooling the thermocouple. Changes in flame position with reference to the thermocouple are caused by changes in the air ratio in the supplied gas-air mixture in units of one part in ten thousand as we can see from the calibrating micrometer reading on the primary air regulator on the control burner. Using this principle, the migration of the floating flame in the combustion chamber of the control burner, due to extremely minute changes in the entrained air in the main gas supply, is used by the thermocouple and the electronic system to regulate the amount of entrained air in the gas mixture being supplied to the burners of an entire industrial plant.

In my invention, the thermocouple is connected by the pair of leads 21 to a thermo-sensitive relay of a type in common use for actuating instruments by change in electrical potential. This instrument is diagrammatically indicated by the numeral 37, and can be a D'Arsonval galvanometer or an instrument known in the art by the name of "Capicitrol" as a trade name. This thermo-sensitive relay is provided with a lead or leads 38 from the power source and is connected by leads 39 to a reversible electric motor 33, previously mentioned. In the embodiment of the invention shown, the thermo-sensitive relay used is one which is commonly employed in process industries. It is of the type wherein the difference in potential, which in our case is set up by the thermocouple, is indicated on a calibrated scale by a pointer to which is attached a light weight metallic vane called the "flag." On the calibrated scale are maintained certain contacts at predetermined critical points which are tripped by the flag, as it moves back and forth, to open or close electrical circuits. In our control system the flag and trips are set such that the pointer operates between certain calibrated maximum and minimum temperature ranges, such that when the thermocouple temperature hits an established point for maximum (in our case set at 1400 degrees F.) an electrical circuit will be closed to start the electric motor 33 in the direction to close the air valve 30. As the air supply is decreased the flame will ascend and the temperature fall. In the fall in temperature, as the pointer and flag pass through our established point for minimum (in our case set at 400 degrees F.) the flag strikes a trip and makes a contact completing an electrical circuit to stop the motor and reverse it to cause the air valve to open. The same cycle being repeated as the temperature rises and the flag trips at the maximum point again.

In operation, my invention will be set up in the gas system as shown in FIG. 4. In the case of an industrial user, conduit 27 will be tapped onto the main gas line 23. The system will be set up such that additional air will be supplied through conduit 31 from a source suitably provided, through valve 30, which will be partially open, as we set up our conditions for calibration. At the outset, therefore, we will be supplying some excess air to the gas mixture into the plant. With this supply of excess air flowing through conduit 29 into the main line 28, we will calibrate the system.

First, the burners at the furnaces in the plant, or the burners at home units, in the case of residential users, will be regulated at the furnaces, by their own primary air control on each individual burner, to give the desired constant B.t.u. delivery. Then, with these burners working properly to give the desired B.t.u. delivery with the supplied gas-air mixture (which has entrained added air as discussed) my control burner is cut in through valve 26. The control burner of my invention is then regulated by means of shutter 9 to draw the flame 40 down to position d, where the flame is stabilized such that its position above the tip of thermocouple 20 is maintained to cause the temperature of the thermocouple to be several hundred degrees below the maximum of 1400 degrees F.; for example, say 800 degrees F.

With the unit thus in operation, it can be seen that any change in the gas mixture being supplied from the main line 28 will be reflected by a change in the behavior of the flame of our control burner. If the main gas mixture becomes richer in air, possibly due to a change in barometric pressure, the flame 40 will start to descend in combustion chamber 24 and come closer to thermocouple 20, increasing the temperature. When the temperature reaches the critical point, 1400 degrees F., the relay 37 will cut in motor 33, closing through its arm and linkage valve 30, thus cutting down on the air which we are supplying as entrained air. A decrease in air will cause the flame 40 to rise in the combustion chamber, moving away from the thermocouple and lowering its temperature. As the temperature becomes lower, and passes through its low critical point, relay 37 will cause the motor 33 to go through its opposite cycle, opening valve 30 and increasing the air supply again. Depending upon the demands of the system, the relay may be calibrated for narrower ranges of critical temperatures, such that the effect of changes in the amount of air in the mixture in the main line will cause more immediate actuating of the valve 30 as the flame 40 seeks to become stabilized.

It can readily be seen that there are many advantages in the use of this floating flame method and apparatus. There is no necessity for the taking of a visible sample of the gas-air mixture for visible analysis, and an operator to constantly adjust the air flow accordingly. The only adjustment is in the initial calibration. Nor is it necessary to determine the B.t.u. value of the gas mixture and regulate the mixture based upon these determinations. It is burner effect that we desire, at the point of combustion. We set up our burners at the point of consumption to give the desired effect. We know then that changes in burner effect may be regulated, after having first set up the furnaces with their orifices set for the normal supplied gas mixture, by compensating for changes in the gas mixture by regulation of the entrained air. This floating flame principle makes it possible to use the flame itself to be self-compensating for changes in the mixture by its movement, operative to change the temperature of a thermocouple and automatically control the entrained air in the main gas supply.

The control burner itself has been designed to provide a uniformly burning flame in its operation. The diffusion chamber 22 is of sufficient size and length to cause a thorough premixing of air and gas, the foraminous plate 18 enhancing this effect as it disperses the mixture in the mixing chamber 24.

In the design of my burner unit, the diameter of combustion chamber 24, as well as the diameter of spud orifice 5 must be selected to give a size flame 40 which will behave in the manner indicated but will not dampen out. I have found that one practical size for the burner unit allows it to be about two feet high, from base of burner to upper end of the combustion chamber 24, with the chamber about one and one-quarter inches in diameter. These sizes are not restricted, but it is obvious that they would in practice be maintained in about the ratio shown for convenience. Having selected the combustion chamber size, and thus determined the size of the burner unit, I insert in the shank 2 of my unit, experimentally, spuds 4 having different sized orifices 5, igniting the flame at the upper end of the combustion chamber and attempting to draw the flame, with inverted meniscus, down into the chamber—as would be required in the normal operation of the unit. Various sized orifices are substituted until one is found which allows the flame to be drawn down without dampening out. It is significant that, in attempting to create a flame with the desired behavior, I found the spud orifice size to be a determining factor in providing a flame which can be drawn into the combustion chamber without dampening out. I have determined that the orifice size should be determined experimentally in construction of the unit in connection with the type of gas being used in the system, since this relationship will vary with such variable factors in each case as gas, density and pressure.

It is within the scope of this invention that various kinds of fuel gas, coal gas, natural gas, refinery gas, carburetted water gas, by product coke oven gas, propane, butane, etc., etc., can be mixed indiscriminately and automatically adjusted by the equipment described herein to conform to the requirements of the gas burners employed for their utilization.

From the foregoing it will be seen that this invention is one well adapted to attain all of the ends and objects herein before set forth, together with other advantages which are obvious and which are inherent to the device.

It will be understood that cetrain features and subcombinations are of utility and may be employed without reference to other features and subcombinations.

This is contemplated by and is within the scope of the claims.

Inasmuch as various modifications of the structure may be made without departing from the scope of the invention, it is to be understood that all matter herein set forth or shown in the accompanying drawings is to be interpreted as illustrative and not in a limiting sense.

Having thus described my invention, I claim:

1. In the method of detecting changes in heating quality of a stream of premixed fuel gas and air which includes the steps of: continuously withdrawing a sample of said stream; continuously mixing the sample with a predetermined proportion of air sufficient for combustion; continuously passing the resulting mixture into an elongated, substantially cylindrical, combustion zone; the improvement comprising the steps of burning said mixture within said zone in the form of a detached, freely suspended, body of flame movable in its entirety axially along said combustion zone responsive to changes in the proportions of gas and air in said mixture; and determining changes in the heating quality of said mixture according to the position of said body of flame in said combustion zone.

2. In the method of detecting changes in heating quality of a stream of premixed fuel gas and air which includes the steps of continuously withdrawing a proportional sample of said stream; continuously mixing the sample with a predetermined proportion of air sufficient for combustion; continuously passing the resultant mixture into an elongated, substantially cylindrical, combustion zone; the improvement which comprises the steps of burning said mixture within said zone in the form of a detached, freely suspended, body of flame, characterized by having its apex in the shape of a concave meniscus, said body of flame being in continuous reciprocal movement within said zone responsive to changes in the proportion of gas and air in said mixture; and varying the amount of air premixed with said fuel gas air mixture according to the change in position of said entire body of flame.

3. In the method of detecting changes in the heating quality of combustible gas mixtures including the steps of: burning a representative sample of said combustible gas mixture in a burning means having an elongated vertically disposed combustion chamber provided with an inlet for said representative sample at its lower end and an outlet at its upper end in communication with the atmosphere; the improvement comprising the steps of: forming in said burner means a tenuous membrane-like combustion reaction product of said combustible gas mixture having an inverted meniscus-like shape; said product being substantially freely suspended and so disposed as to freely migrate longitudinally throughout the axial length of said combustion chamber; calibrating and stabilizing the relative position of said reaction product within said burner means at a position juxtaposed a thermosensitive transducer means; said thermosensitive transducer means operatively affected by the relative proximity of said reaction product in such manner so as to actuate automatically means responsive to said thermosensitive transducer means in proportional and dependent relationship to the relative position of said reaction product in a manner such that a deficiency of combustion supporting medium in said mixture of combustibles substantially affects a rapid movement of said combustion reaction product in a substantially instantaneously upward movement away from said thermosensitive transducer means and conversely such that a surplus of combustion supporting medium in said mixture of combustibles substantially and instantaneously affects a rapid movement of said combustion reaction product in a downward movement toward said thermosensitive transducer means.

4. In the method as in claim 3, the improvement as set forth in the steps therein, with the additional improvement comprising the step of employing said thermosensitive transducer means operably actuated by the potential flowing therethrough increasing and decreasing the amount of combustion supporting medium in said mixture by valve means operable responsive to the relative increase and decrease of said potential to increase or decrease the flow of said combustion supporting medium into said combustible gas mixture.

5. In apparatus for detecting changes in the heating quality of combustible gas mixtures including a burner means having an elongated vertically disposed combustion chamber, said combustion chamber provided with an inlet comprising a spud having an orifice of predetermined diameter for admittance of a representative sample of said gas mixture at its lower end, and an outlet at its upper end in communication with the atmosphere, a thermosensitive transducer means positioned within said combustion chamber at a point approximately half way between the longitudinal extremities of said combustion chamber, said transducer means operatively connected to automatically operable means for controlling the supply of air into the combustion supporting gas mixture; the improvement comprising means adapted to support in said combustion chamber a tenuous membrane-like combustion reaction product of said combustible gas mixture, said reaction product having a meniscus-like shape, said reaction product being substantially freely suspended and so disposed as to freely migrate longitudinally throughout the axial length of said combustion chamber in such manner as to actuate automatically said operatively connected transducer means in proportional and dependent relationship to the relative position of said reaction product in such manner that a deficiency of combustion supporting medium in said mixture of combustibles substantially affects a rapid movement of said reaction product in a substantially instantaneously upward movement away from said thermosensitive transducer means and conversely such that a surplus of combustion supporting medium in said mixture of combustibles substantially and instantaneously affects a rapid movement of said combustion reaction product in a downward movement toward said thermosensitive transducer means, said means comprising said combustion chamber and said spud having said orifice disposed in operable relationship and dependent upon the ratio between the diameter of said combustion chamber and said orifice in order to maintain said reaction product in the form aforesaid within said longitudinal extremities of said combustion chamber.

References Cited in the file of this patent

UNITED STATES PATENTS

| | | |
|---|---|---|
| 681,052 | Harris | Aug. 20, 1901 |
| 977,970 | Sawford | Dec. 6, 1910 |
| 1,062,640 | Eimer | May 27, 1913 |
| 1,686,751 | Hutton et al. | Oct. 9, 1928 |
| 1,704,010 | Pinkerton | Mar. 5, 1929 |
| 1,995,979 | Gray | Mar. 26, 1935 |
| 2,052,181 | Krogh | Aug. 25, 1936 |
| 2,058,522 | Smyly | Oct. 27, 1936 |
| 2,366,170 | Bates | Jan. 2, 1945 |
| 2,399,830 | Schmidt | May 7, 1946 |
| 2,603,085 | Cannon | July 15, 1952 |

FOREIGN PATENTS

| | | |
|---|---|---|
| 416,972 | Great Britain | Sept. 25, 1934 |